United States Patent
Sakane (10) Patent No.: US 7,543,097 B2
(45) Date of Patent: Jun. 2, 2009

(54) FLEXIBLE WIRING SYSTEM FOR ELECTRONIC APPARATUS

(75) Inventor: Hiroyuki Sakane, Anjo (JP)

(73) Assignee: DENSO Corporation, Kariya (JP)

( * ) Notice: Subject to any disclaimer, the term of this patent is extended or adjusted under 35 U.S.C. 154(b) by 59 days.

(21) Appl. No.: 11/511,350

(22) Filed: Aug. 29, 2006

(65) Prior Publication Data

US 2007/0050529 A1   Mar. 1, 2007

(30) Foreign Application Priority Data

Aug. 30, 2005   (JP)   ............................. 2005-248948

(51) Int. Cl.
*G06F 13/00* (2006.01)
*H01R 12/00* (2006.01)
*B60L 1/00* (2006.01)

(52) U.S. Cl. ...................... 710/300; 439/76.2; 439/259; 307/9.1; 307/10.1

(58) Field of Classification Search .................. 439/259
See application file for complete search history.

(56) References Cited

U.S. PATENT DOCUMENTS

| | | | |
|---|---|---|---|
| 3,832,009 A | | 8/1974 | Leiber et al. |
| 4,832,403 A | * | 5/1989 | Tomita ........................ 297/330 |
| 5,502,615 A | * | 3/1996 | Kubota et al. ................ 361/647 |
| 5,711,675 A | * | 1/1998 | Nishitani et al. ............... 439/34 |
| 5,808,371 A | | 9/1998 | Kon'i et al. |
| 5,859,845 A | | 1/1999 | Oniishi et al. |
| 5,917,249 A | | 6/1999 | Kon'i et al. |
| 6,020,811 A | | 2/2000 | Saito et al. |
| 6,087,777 A | | 7/2000 | Long |
| 6,107,696 A | | 8/2000 | Peter et al. |
| 6,166,453 A | | 12/2000 | Kon'i et al. |
| 6,172,613 B1 | * | 1/2001 | DeLine et al. ............ 340/815.4 |
| 6,182,807 B1 | | 2/2001 | Saito et al. |
| 6,236,918 B1 | | 5/2001 | Sonoda et al. |
| 6,243,018 B1 | | 6/2001 | Saito et al. |
| 6,356,826 B1 | | 3/2002 | Pohjola |

(Continued)

FOREIGN PATENT DOCUMENTS

DE   39 13 266   10/1990

(Continued)

OTHER PUBLICATIONS

U.S. Appl. No. 11/511,372, filed Aug. 29, 2006.

(Continued)

*Primary Examiner*—Mark Rinehart
*Assistant Examiner*—Brian T Misiura
(74) *Attorney, Agent, or Firm*—Nixon & Vanderhye P.C.

(57) ABSTRACT

A flexible wiring system for an electronic system includes a basic control circuit for controlling specific control circuits to obtain data from a sensor, a communication bus connected with the basic control circuit and the specific control circuits, and an intermediate distributing unit. The intermediate distributing unit includes plural first side connectors connectable with the basic control circuit and the specific control circuits, plural second side connectors connectable with sensors and actuators. The basic control circuit communicates signals with the specific control circuits via the communication bus so that the specific control circuits can control corresponding actuators according to the data obtained from corresponding sensors via the intermediate distributing unit.

9 Claims, 7 Drawing Sheets

U.S. PATENT DOCUMENTS

| | | | |
|---|---|---|---|
| 6,401,891 B1 | 6/2002 | Saito et al. | |
| 6,408,998 B1 | 6/2002 | Saito et al. | |
| 6,420,799 B1 | 7/2002 | Sakamoto et al. | |
| 6,469,404 B1 | 10/2002 | Pohjola | |
| 6,472,770 B1 | 10/2002 | Pohjola | |
| 6,479,973 B2 | 11/2002 | Saito et al. | |
| 6,511,342 B1* | 1/2003 | Hein et al. | 439/502 |
| 6,676,186 B2 | 1/2004 | Greif | |
| 6,743,027 B1* | 6/2004 | Kowtun | 439/76.2 |
| 6,769,521 B2 | 8/2004 | Saito et al. | |
| 6,900,555 B2 | 5/2005 | Sakamoto et al. | |
| 7,132,761 B2* | 11/2006 | Rhodes | 307/10.1 |
| 2002/0043964 A1 | 4/2002 | Saito et al. | |
| 2003/0090153 A1 | 5/2003 | Rhodes | |
| 2003/0098211 A1 | 5/2003 | Saito et al. | |
| 2005/0168072 A1 | 8/2005 | Saito et al. | |
| 2006/0238938 A1* | 10/2006 | Shaya et al. | 361/78 |

FOREIGN PATENT DOCUMENTS

| | | |
|---|---|---|
| DE | 103 16 694 | 10/2004 |
| DE | 103 52 036 | 6/2005 |
| JP | 2000-253514 | 9/2000 |
| JP | 2004-306848 | 11/2004 |
| WO | 2004/089697 A1 | 10/2004 |

OTHER PUBLICATIONS

Office Action issued Jul. 29, 2008 in corresponding German Application No. 10 2006 040 404.1-55 and an at least partial English language translation thereof.

* cited by examiner

FLEXIBLE WIRING SYSTEM FOR ELECTRONIC APPARATUS

CROSS REFERENCE TO RELATED APPLICATION

The present application is based on and claims priority from Japanese Patent Application 2005-248948, filed Aug. 30, 2005, the contents of which are incorporated herein by reference.

BACKGROUND OF THE INVENTION

1. Field of the Invention

The present invention relates to a flexible wiring system for connecting an extra electronic device with an electronic system of a vehicle.

2. Description of the Related Art

Electronic devices that are mounted in a vehicle are increasing year by year. Various electronic devices are mounted in various portions or areas of a vehicle, such as the engine compartment, the passenger compartment, the instrument panel and/or the roof liner area. Such electronic devices are connected with one or a plurality of control circuits (ECU) by specific wire harnesses and intermediate distributing units or junction boxes, as disclosed in JP-A-2000-253514.

There is a demand to connect an additional electronic device such as an actuator or a sensor with an extra terminal of an ECU, or a demand to connect the same kind of sensors respectively to a plurality of electronic control units. Because an intermediate distributing unit is disposed between the electronic control units and the additional electronic device, it is necessary to change a distributing board of the intermediate distributing unit, which causes additional cost and works.

Assuming that a new electronic control device such as an air condition control unit that requires one of electronic devices, such as an outside temperature sensor, for an electronic control unit that is already connected to the intermediate distributing unit, is to be connected to the same. It is more preferable for the two control units to commonly use the one of the electronic devices (e.g. outside temperature sensor) than to add the same electronic device if additional work or cost can be limited.

Assuming that an electronic device that is connected with the input side of an electronic control unit via a wire harness is to be changed to another electronic device that is to be connected with the input side of the same electronic control unit via another wire harness. It may be necessary to have new connectors and/or to modify the intermediate distributing unit.

SUMMARY OF THE INVENTION

Therefore, an object of the invention is to provide an improved wiring system for readily changing an electronic device that is connected with an electronic control unit via a wire harness to another electronic device that is to be connected with the same electronic control unit via another wire harness at a low cost.

According to a feature of the invention, a flexible wiring system includes a basic control circuit for controlling specific control circuits such as air condition control circuit to obtain data from an inputting device such as outside temperature, a communication bus connected with the basic control circuit and the specific control circuits and an intermediate distributing unit that includes plural first side connectors connectable with the basic control circuit and the specific control circuits, plural second side connectors connectable with the inputting devices and the outputting devices such as an air condition unit. The basic control circuit communicates signals with the specific control circuits via the communication bus so that the specific control circuits can control the outputting device according to the data obtained from the inputting device via the intermediate distributing unit.

According to the invention of the above flexible wiring system, the following embodiments may be further conceived:

(a) the intermediate distributing unit may connect the inputting devices with the basic control circuit, which delivers data obtained from the inputting devices to the specific control circuits via the communication bus;

(b) the intermediate distributing unit may connect the outputting devices with the basic control circuit, which controls the outputting device according to data obtained from the inputting devices;

(c) the intermediate distributing unit may include plural second side connectors which are respectively connectable with plural inputting devices, while the basic control circuit delivers the specific control devices a signal to select one of the second side connectors;

(d) the intermediate distributing unit may include a changeover switch disposed between one of the first side connectors, which is connected to one of the specific control circuits, and plural second side connectors, while the basic control circuit includes means for controlling the changeover switch to change over connection of one of the first side connectors from one to another of the second side connectors; and (e) the intermediate distributing unit may include plural second side connectors, which are respectively connectable with plural inputting devices, and a changeover switch disposed between plural first side connectors, which are connectable with one of the inputting devices, and one of the second side connectors, while the basic control circuit includes means for controlling the changeover switch to change over connection of one of the first side connectors from one to another of the second side connectors, thereby to deliver the one of the specific control circuits a signal as to whether one of the inputting device is connected to a selected one of the first side connectors or not.

The above flexible wiring system may further include means, disposed in one of the specific control circuits, for providing an indication signal indicating one of the first side connectors to be connected. The means for controlling the changeover switch operates according to the indication signal.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

The present invention will be described with reference to the appended drawings hereafter.

A flexible wiring system according to the first embodiment of the invention will be described with reference to FIGS. 1-3.

Figure 1:
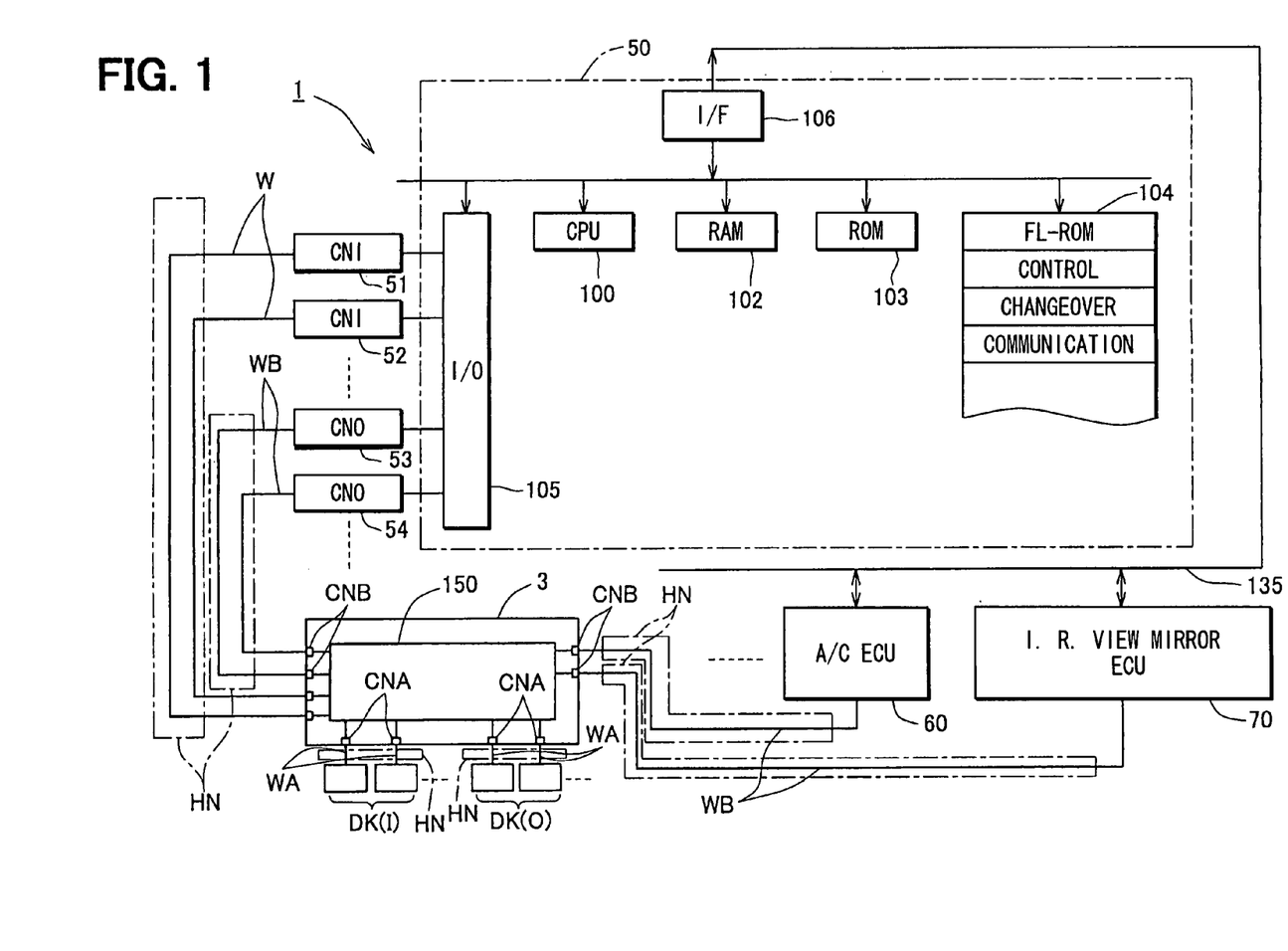
FIG. 1 is a block diagram illustrating an overview of a hardware of a flexible wiring system according to the present invention applied to an electronic system for a vehicle.

As shown in FIG. 1, a vehicle electronic system 1 includes an intermediate distributing unit or a junction box 3, plural inputting electronic devices DK(I), plural outputting electronic devices DK(O), a basic control unit 50, an air conditioning ECU 60 and an inside rear view mirror ECU 70, each of which control the outputting electronic devices DK(O) based on the signals of the inputting electronic devices DK(I) in preset manners. A flexible wiring system is mainly formed of the basic control unit 50 and the intermediate distributing unit 3.

The intermediate distributing unit 3 has a connection changeover mechanism 150, plural A-side connectors CNA and plural B-side connectors CNB. The inputting and outputting electronic devices DK(I), DK(O) are respectively connected by wires WA and WB with the basic control unit 50, the air conditioning ECU 60, and the inside rear view mirror 70 via the A-side and the B-side connectors CNA, CNB of the intermediate distributing unit 3, input side connectors (CNI) 51, 52 and output side connectors (CNO) 53, 54.

The wires WA and WB are respectively accommodated in wire harnesses HN that are respectively located at specific areas of a vehicle. The connection changeover mechanism 150 includes a wiring arrangement, plural changeover switches for connecting or disconnecting one or some of the A-side connectors CNA with or from any one or some of the B-side connectors. The wiring arrangement includes bus bars for supplying power and printed wires for supplying signals. The switches include relay switches (or a switch matrix) for switching power and analog switches (or a switch matrix) for switching signals.

The basic control unit(basic ECU) 50 includes a CPU 100, a RAM 102, a ROM 103, a flash ROM 104, an I/O port 105 and a communication I/F circuit 106, which are connected each other by a bus bar in a usual manner. The flash ROM 104 stores device controlling application programs, a changeover control program, a communication software and connection setting data. The CPU 100, RAM 102, ROM 103 and the flash ROM 104, the I/O port 105 are connected with a serial bus bar 135, which connects to the air condition ECU 60 and the inside rear view mirror ECU 70, via the communication I/F circuit 106. The I/O port 105 is connected with B-side connectors CNB of the intermediate distributing unit 3 via the input side connectors (CNI) 51, 52 and the output-side connectors (CNO) 53, 54.

Figure 2:
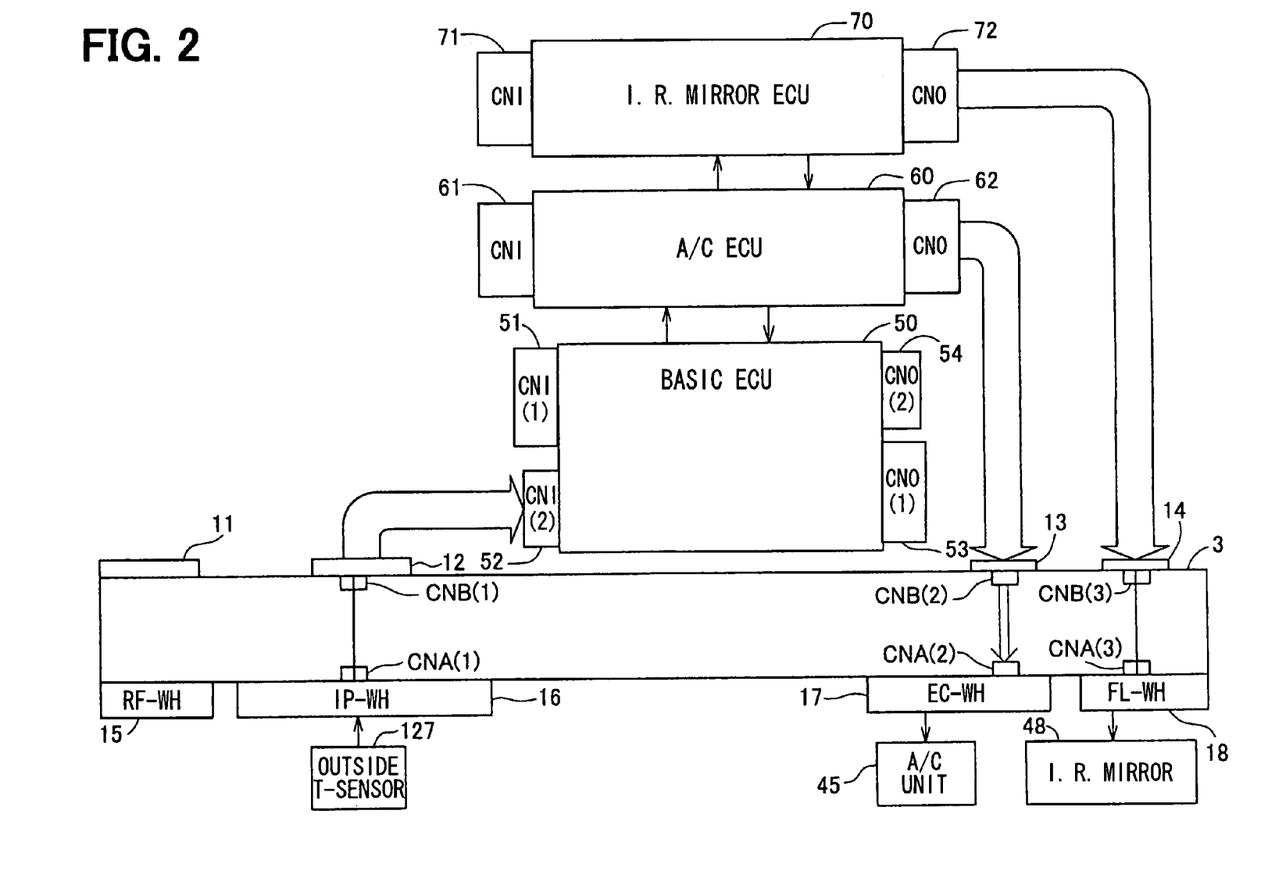
FIG. 2 is a block diagram of a flexible wiring system according to the first embodiment of the invention.

As shown in FIG. 2, the flexible wiring system according to the first embodiment connects the input side of the basic ECU 50 with an outside temperature sensor 127, the output side the air condition unit 60 with the air condition unit 45, and the output side of an inside rear view mirror ECU 70 with an inside rear view mirror 48.

The air condition ECU 60 controls the air condition unit 45 according to the signal sent from the outside temperature sensor 127. The inside rear view mirror ECU 70 displays an outside temperature detected by the outside temperature sensor 127 on a portion of the inside rear view mirror 48.

The intermediate distributing unit 3 includes a first A-side connector CNA(1), a second A-side connector CNA(2), a third A-side connector CNA(3), a first B-side connector CNB(1), a second B-side connector CNB(2) and a third B-side connector CNB(3). The first A-side connectors CNA(1) is connected via the instrument panel wire harness 16 with the outside temperature sensor 127 and the first B-side connector CNB(1). The second A-side connector CNA(2) is connected via the engine compartment wire harness 17 with the air condition unit 45 and the second B-side connector CNB(2). The third A-side connector CNA(3) is connected via the floor wire harness 18 with the inside rear view mirror 48 and the third B-side connector CNB(3). The first B-side connector CNB(1) is connected with a second input side connector 52 of the basic ECU 50 via a wire harness 12, the second B-side connector CNB(2) is connected via a wire harness 13 with the output side connector 62 of the air condition ECU 60, and the third B-side connector CNB(3) is connected via a wire harness 14 with the output side connector 72 of the inside rear view mirror ECU 70.

The temperature data of the outside temperature sensor 127 are taken by the basic ECU 50, which delivers the temperature data via a communication bus (e.g. 135), as shown in arrows, to the air condition ECU 60 and the rear view mirror ECU 70. Incidentally, each of the air condition ECU 60 and the rear view mirror ECU 70 sends an acknowledgement signal when it receives the temperature data.

Figure 3:
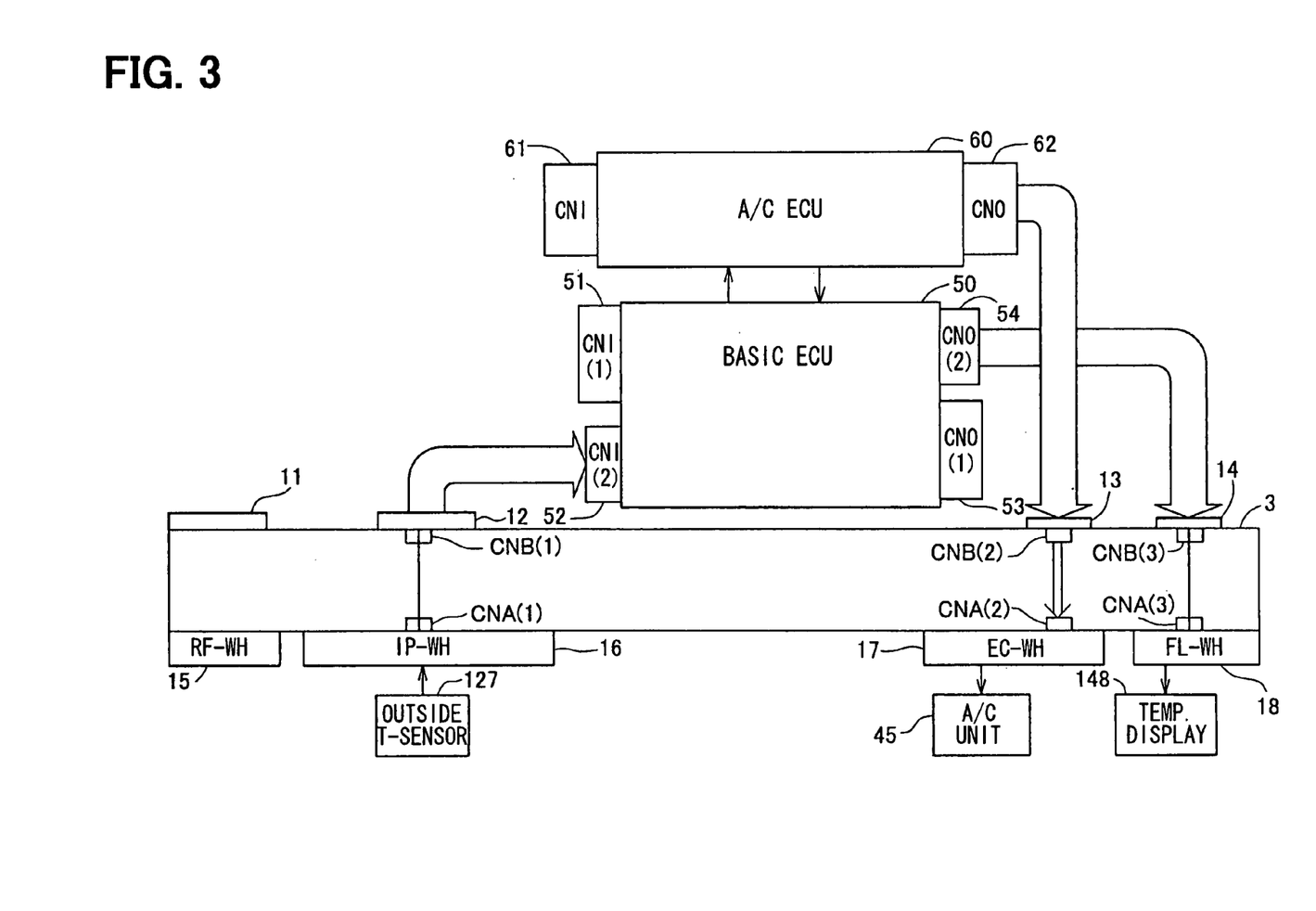
FIG. 3 is a block diagram of a flexible wiring system according to a variation of the first embodiment of the invention.

As shown in FIG. 3, the flexible wiring system according to a variation of the first embodiment connects the input side of the basic ECU 50 with the outside temperature sensor 127, the output side of the basic ECU 50 is connected with an outside temperature display panel 148, and the output side of the air condition unit 60 with the air condition unit 45, if the rear view mirror system that includes the ECU 70 and the inside rear view mirror 48 is omitted.

The first A-side connectors CNA(1) is connected via the instrument panel wire harness 16 with the outside temperature sensor 127, the second A-side connector CNA(2) is connected via the engine compartment wire harness 17 with the air condition unit 45, and the third A-side connector CNA(3) is connected via the floor wire harness 18 with the outside temperature display panel 148. The first B-side connector CNB(1) is connected with the second input side connector 52 of the basic ECU 50 via the wire harness 12 to deliver the basic ECU 50 the signal of the outside temperature sensor 127, the second B-side connector CNB(2) is connected via the wire harness 13 with the output side connector 62 of the air condition ECU 60 to control the air condition unit 45 according to the outside temperature, the third B-side connector CNB(3) connected via the wire harness 14 with a second output side connector 54 of the basic ECU 50 to display an outside temperature on the temperature display panel 148.

The temperature data of the outside temperature sensor 127 are taken by the basic ECU 50, which delivers the temperature data via a communication bus, as shown in an arrow, to the air condition ECU 60. The air condition ECU 60 sends an acknowledgement signal when it receives the temperature data.

Figure 4:
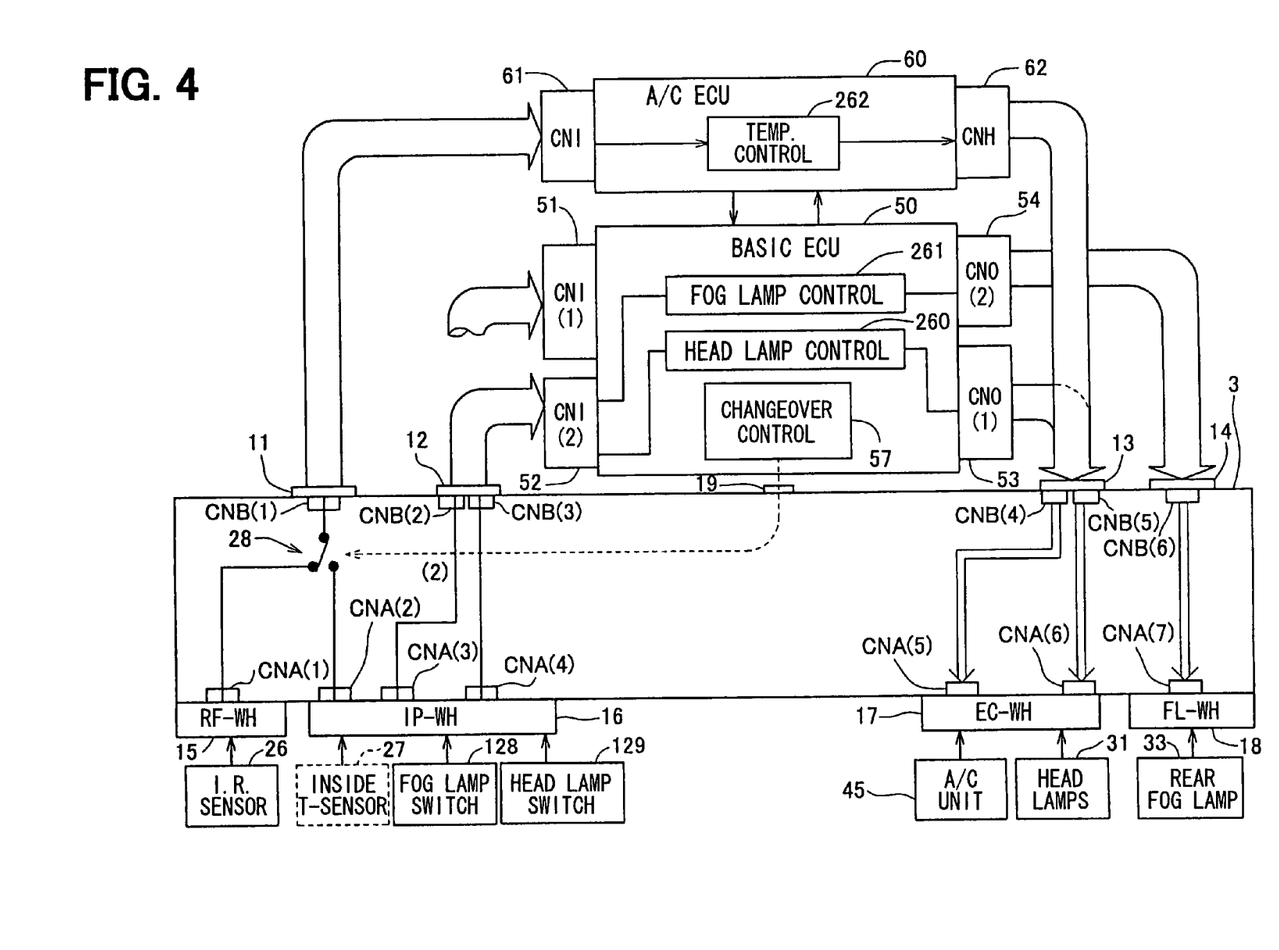
FIG. 4 is a block diagram of a flexible wiring system according to the second embodiment of the invention.

A flexible wiring system according to the second embodiment of the invention will be described with reference to FIGS. 4 and 5.

Assuming that an air condition system, which includes an air condition ECU 60, an infrared light (IR) sensor 26 and an air condition unit 45, is to be mounted in a vehicle. The intermediate distributing unit 3 includes the first A-side connectors CNA(1) connected via the roof wire harness 15 with the infrared light sensor 26, the second A-side connector CNA(2), the third A-side connector CNA(3), the fourth A-side connector CNA(4), the fifth A-side connector CNA (5), the sixth A-side connector CNA(6), and the seventh A-side connector CNA(7) connected with rear fog lamps 33 via the floor wire harness 18. The second A-side connector CNA(2), the third A-side connector CNA(3) and the fourth A-side connector CNA(4) are respectively connected through the instrument panel wire harness 16 with an inside air temperature sensor 27, a rear fog lamp switch 128 and a head lamp switch 129 which is connected via the instrument panel wire harness 16 with the air condition ECU 60, which is connected via the instrument panel wire harness 16 with a head lamp control circuit disposed in the basic control unit 50 The fifth A-side connector CNA(5) and the sixth A-side connector CNA(6) are respectively connected via the engine compartment wire harness 17 with the air condition unit 45, and head lamps 31.

The intermediate distributing unit 3 further includes the first B-side connector CNB(1), the second B-side connector CNB(2), the third B-side connector CNB(3), the fourth B-side connector CNB(4), the fifth B-side connector CNB(5) and the sixth B-side connector CNB(6). The first B-side connector CNB(1) is connected, via the wire harness 11 and the input side connector 61, with a room temperature control circuit 262 of the air condition ECU 60. The first B-side connector CNB(1) is also connected with one of a pair of the first and the second A-side connectors CNA(1), CNA(2) via a changeover switch 28. The second B-side connector CNB(2) and the third B-side connector CNB(3) respectively connect the second and third A-side connectors CNA(2) and CNB(3) via the wire harness 12 with the second input side connector 52 of the basic control unit 50. The fourth B-side connector CNB(4) and the fifth B-side connector CNB(5) respectively connect an output side connector 62 of the air condition ECU 60 and the first output side connector 53 of the basic ECU 50 with the fifth and sixth A-side connectors CNA(5) and CNA (6). The fifth B-side connector CNB(5) connects the second output side connector 54 of the basic ECU 50 with the seventh A-side connector CNA(7). Incidentally, the first input side connector 51 may be connected with some other B-side connector CNB (not shown) via another wire harness.

Figure 5:
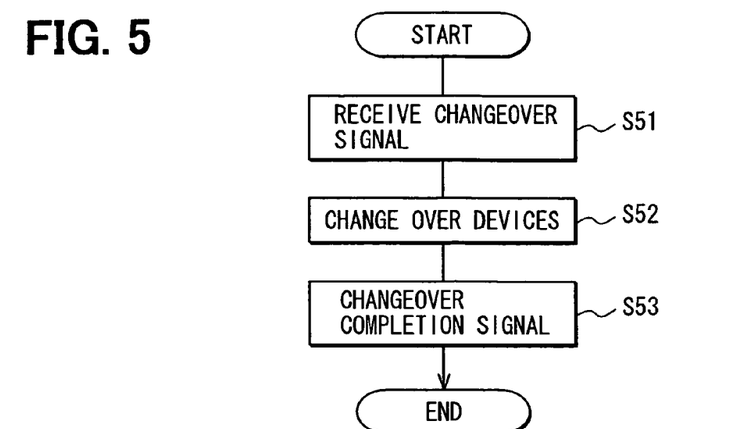
FIG. 5 is a flow diagram of a control program to be applied to the flexible wiring systems shown in FIG. 4.

The changeover program of the control unit 50 operates as shown in FIG. 5. The control unit 50 receives from the air condition ECU 60, via the communication bus 135 shown in FIG. 1, information about which of the devices (IR sensor 26 or the inside air temperature sensor 27) is to be connected with the input side connector 61 at S51. For example, the changeover control circuit 57 controls the changeover switch 28 to connect the first B-side connector CNB(1), which is connected with the input side connector 61, with the first A-side connector CNA (1), which is connected with the IR sensor 26, instead of the second A-side connector CNA(2), which is connected with the inside air temperature sensor 27 at S52. When the changeover operation is completed, a completion signal is sent to the air condition ECU 60 at S53.

Figure 6:
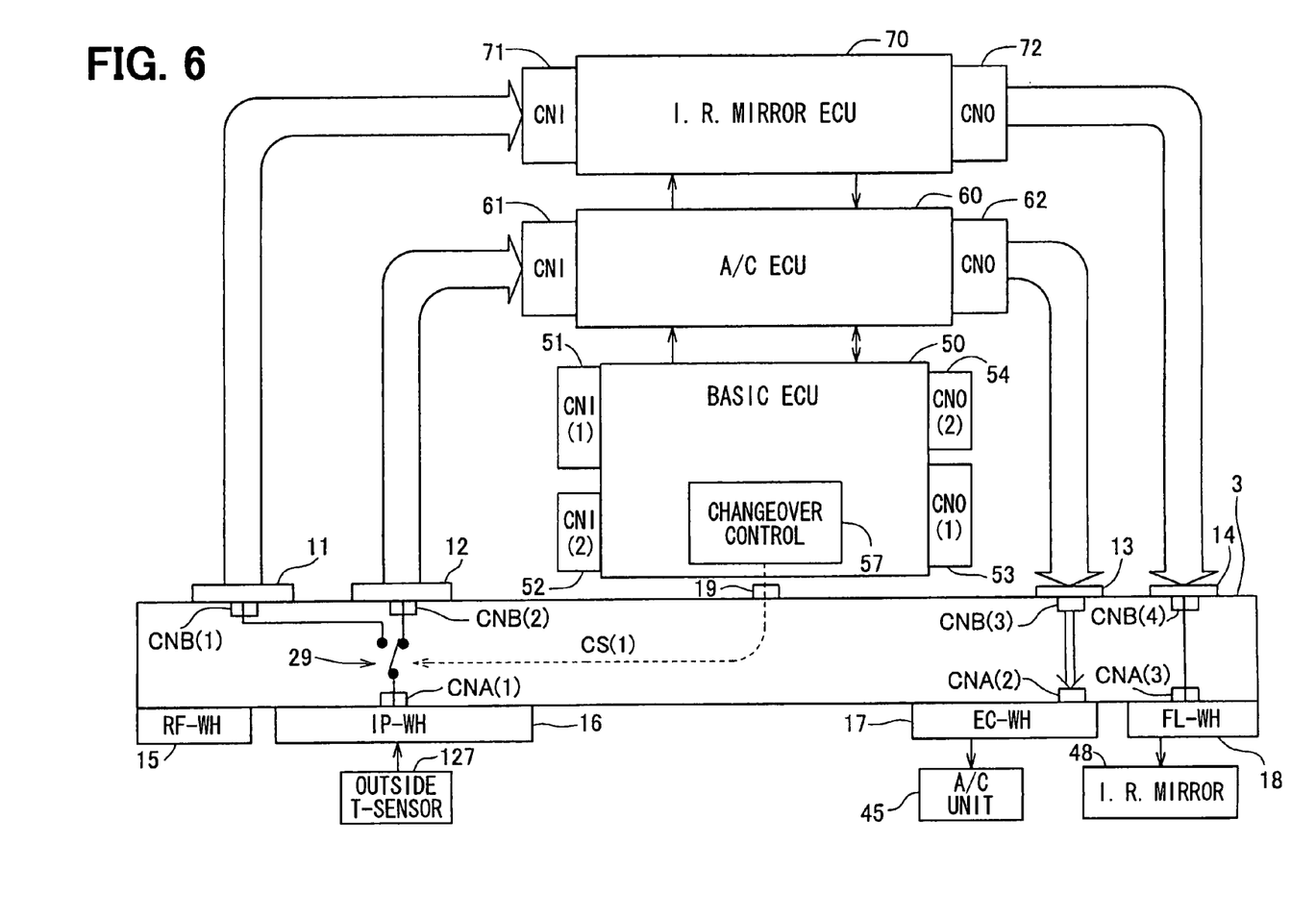
FIG. 6 is a block diagram of a flexible wiring system according to the third embodiment of the invention.

A flexible wiring system according to the fourth embodiment of the invention will be described with reference to FIGS. 6-8.

The flexible wiring system is to connect an inside rear view mirror ECU 70 with an inside rear view mirror 48 in addition to the air condition ECU 60, an outside temperature sensor 127 and the air condition unit 45, which are mounted in the vehicle as a standard equipment.

The air condition ECU 60 controls the air condition unit 45 according to the signal sent from the outside temperature sensor 127. The inside rear view mirror ECU 70 displays an outside temperature detected by the outside air temperature sensor 127 on a portion of the inside rear view mirror 48.

The intermediate distributing unit 3 includes the first A-side connectors CNA(1) connected via the instrument panel wire harness 16 with the outside temperature sensor 127, the second A-side connector CNA(2) connected via the engine compartment wire harness 17 with the air condition unit 45, the third A-side connector CNA(3) connected via the floor wire harness 18 with the inside rear view mirror 48. The intermediate distributing unit 3 further includes the first B-side connector CNB(1) connected with an input side connector 71 of the inside rear view mirror ECU 70 via the wire harness 11, the second B-side connector CNB(2) connected via the wire harness 12 with the input side connector 61 of the air condition ECU 60. The third B-side connector CNB(3) connects, via the wire harness 13 and the output side connector 62, the air condition ECU 60 with the second A-side connector CNA(2) to control the air condition unit 45, and the fourth B-side connector CNB(4) connects, via the output side connector 72, the inside rear view mirror ECU 70 with the third A-side connector CNA(3) to display an outside temperature on a portion of the inside rear view mirror 48.

The changeover mechanism 150 also includes a changeover switch 29 disposed between the first A-side connector CNA(1) and a pair of the first and the second B-side connectors CNB(1), CNB(2). When the inside rear view mirror ECU 70 and the inside rear view mirror 48 are mounted as an optional system, the outside temperature sensor 127, which is already connected to the input side of the air condition control ECU 60, is not directly connected to the input side of the inside rear view mirror ECU 70 via the first B-side connector CNB(1). The data of the outside temperature sensor 127 taken by the air condition control ECU 60 is transmitted to the inside rear view mirror ECU 70 via a communication bus to display an outside temperature.

For this purpose, the changeover control circuit 57 controls the changeover switch 29 to connect the second B-side connector CNB(2), which is connected with the input side connector 61, with the second A-side connector CNA (2), which is connected with the outside temperature sensor 127. When the changeover operation is completed, a completion signal is sent to the air condition ECU 60.

Figure 7:
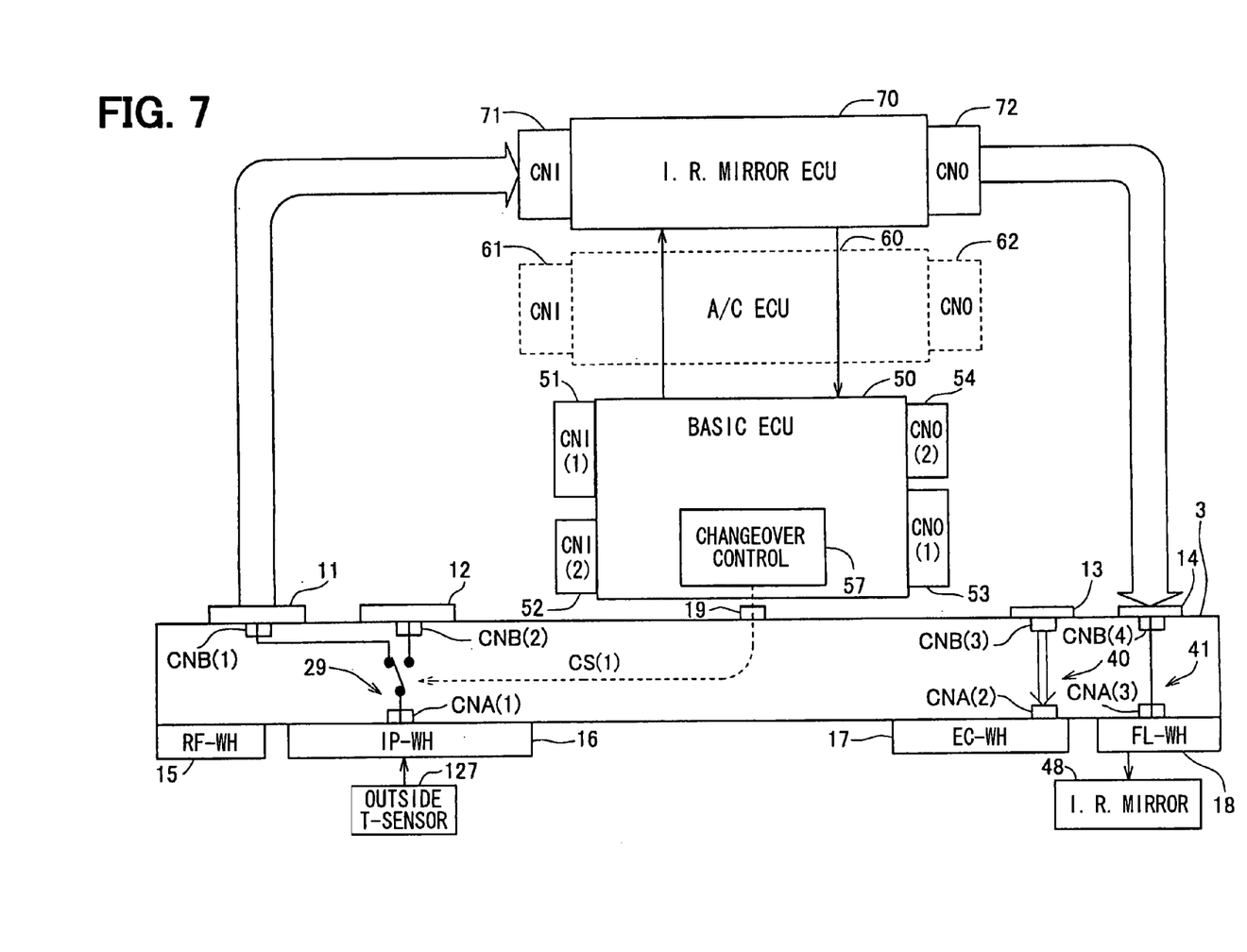
FIG. 7 is a block diagram of a flexible wiring system according to a variation of the third embodiment of the invention.

If a vehicle is sold in a cold district where the air conditioning is not usually necessary, the second B-side terminal CNB(2), the first A-side connector CNA(1), the third B-side connector (3) and the second A-side connector CNA(2) are reserved for the outside temperature sensor 127, the air condition ECU 60 and the air condition unit 45 to meet the user's demand for the air condition system, as shown in FIG. 7. In this case, the changeover switch 29 connects the first B-side connector CNB(1) with the first A-side connector CNA(1) so that the outside temperature sensor 127 can directly connect with the inside rear view mirror ECU 70.

Figure 8:
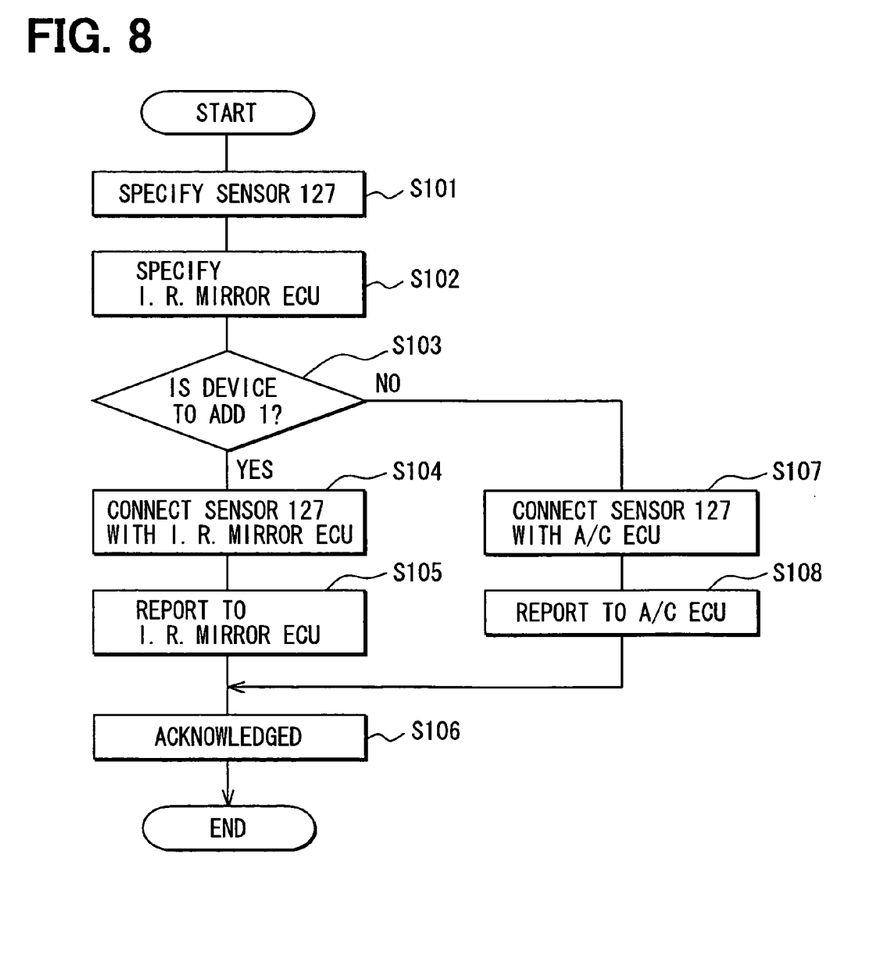
FIG. 8 is a flow diagram of a control program to be applied to the flexible wiring systems shown in FIGS. 6 and 7.

The changeover program of the control unit 50 operates as shown in FIG. 8.

At first, the outside temperature sensor 127 is specified at S101. Then, the inside rear view mirror ECU 70 as an additional ECU that requires the data detected by the outside temperature sensor 127 is specified at S102. Subsequently, whether the additional ECU is one or not is examined at S103.

If the result of the examination is Yes, the changeover switch 29 is controlled to connect the outside temperature sensor 127 with the inside rear view mirror ECU 70 at S104, and the completion of the connection is reported to the inside rear view mirror ECU 70 at S105. After an acknowledgement signal is received from the inside rear view mirror ECU 70 at S106, the program ends.

If the result of the examination at S103 is No, the changeover switch 29 is controlled to connect the outside temperature sensor 127 with the air condition ECU at S107, and the completion of the connection is reported to the air condition ECU 60 and instructs the same to deliver the inside rear view mirror ECU 70 the data detected by the outside temperature sensor 127 at S108. Thereafter, the step goes to S106.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A flexible wiring system for an electronic system that includes inputting devices, outputting devices, a plurality of specific control circuits for controlling the outputting devices based on signals of the inputting devices and a plurality of wire harnesses accommodating wires connecting the inputting devices, the outputting devices and the specific control circuits, said flexible wiring system comprising:
    a basic control circuit for controlling said specific control circuits to obtain data from said inputting devices;
    a communication bus connected with said basic control circuit and said specific control circuits; and
    an intermediate distributing unit including a plurality of first side connectors connectable with an input side of said basic control circuit and said specific control circuits via a portion of said wire harnesses, a plurality of second side connectors connectable with said inputting devices and said outputting devices via another portion of said wire harnesses and a connection changeover mechanism for connecting or disconnecting one of said second side connectors with or from one of said first side connectors; wherein
    said basic control circuit communicates signals with one of said specific control circuits via said communication bus to control said connection changeover mechanism so that said one of said specific control circuits can control one of said outputting devices via said intermediate distributing unit according to the data obtained from one of said inputting devices via said intermediate distributing unit.

2. A flexible wiring system as claimed in claim 1, wherein:
    said intermediate distributing unit connects said one of said inputting devices with said basic control circuit; and
    said basic control circuit delivers data obtained from said one of said inputting devices to said one of specific control circuits via said communication bus.

3. A flexible wiring system as claimed in claim 2, wherein:
    said intermediate distributing unit connects said one of said outputting devices with said basic control circuit; and
    said basic control circuit controls said one of said outputting devices according to data obtained from said one of said inputting devices.

4. A flexible wiring system as claimed in claim 1, wherein:
    said intermediate distributing unit includes a plurality of said second side connectors which are respectively connectable with a plurality of said inputting devices; and
    said basic control circuit delivers said one of said specific control devices a signal to select one of said plurality of second side connectors.

5. A flexible wiring system as claimed in claim 1, wherein:
    said changeover mechanism comprises a changeover switch disposed between one of said first side connectors, which is connected to one of said specific control circuits, and a plurality of said second side connectors; and
    said basic control circuit includes a changeover control circuit for controlling said changeover switch to change over connection of one of said first side connectors from one to another of said second side connectors.

6. A flexible wiring system for an electronic system that includes inputting devices, outputting devices, a plurality of specific control circuits for controlling the outputting devices based on signals of the inputting devices and a plurality of wire harnesses accommodating wires connecting the inputting devices, the outputting devices and the specific control circuits, said flexible wiring system comprising:
    a basic control circuit for controlling said specific control circuits to obtain data from said inputting devices;
    a communication bus connected with said basic control circuit and said specific control circuits; and
    an intermediate distributing unit including a plurality of first side connectors connectable with an input side of said basic control circuit and said specific control circuits, a plurality of second side connectors connectable with said inputting devices and said outputting devices and a connection changeover mechanism for connecting or disconnecting one of said second side connectors with or from one of said first side connectors; wherein
    said basic control circuit communicates signals with one of said specific control circuits via said communication bus to control said connection changeover mechanism so that said one of said specific control circuits can control one of said outputting devices via said intermediate distributing unit according to the data obtained from one of said inputting devices via said intermediate distributing unit;
    said changeover mechanism comprises a changeover switch disposed between one of said first side connectors, which is connected to one of said specific control circuits, and a plurality of said second side connectors; and
    said basic control circuit includes a changeover control circuit for controlling said changeover switch to change over connection of one of said first side connectors from one to another of said second side connectors;
    the flexible wiring system further comprises a control circuit, disposed in one of said specific control circuits, for providing an indication signal indicating one of said first side connectors to be connected,
    wherein said changeover control circuit for controlling said changeover switch operates according to said indication signal.

7. A flexible wiring system for an electronic system that includes inputting devices, outputting devices, a plurality of specific control circuits for controlling the outputting devices based on signals of the inputting devices and a plurality of wire harnesses accommodating wires connecting the inputting devices, the outputting devices and the specific control circuits, said flexible wiring system comprising:
    a basic control circuit for controlling said specific control circuits to obtain data from said inputting devices;
    a communication bus connected with said basic control circuit and said specific control circuits; and an intermediate distributing unit including a plurality of first side connectors connectable with an input side of said basic control circuit and said specific control circuits, a plurality of second side connectors connectable with said inputting devices and said outputting devices and a connection changeover mechanism for connecting or disconnecting one of said second side connectors with or from one of said first side connectors; wherein said basic control circuit communicates signals with one of said specific control circuits via said communication bus to control said connection changeover mechanism so that said one of said specific control circuits can control one of said outputting devices via said intermediate distributing unit according to the data obtained from one of said inputting devices via said intermediate distributing unit;

said intermediate distributing unit comprises a plurality of said second side connectors, which are respectively connectable with a plurality of said inputting devices, and a changeover switch disposed between a plurality of said first side connectors, which are connectable with one of said inputting devices, and one of said second side connectors;

said basic control circuit includes a changeover control circuit for controlling said changeover switch to change over connection of one of said first side connectors from one to another of said second side connectors; and said basic control circuit delivers said one of said specific control circuits a signal as to whether one of said inputting device is connected to a selected one of said first side connectors or not.

8. A flexible wiring system as claimed in claim 1, wherein said connection changeover mechanism includes a wiring arrangement, plural changeover switches for connecting or disconnecting one of said second side connectors with or from one of said first side connectors, said wiring arrangement including a first wire member for supplying power and a second wire member for supplying signals.

9. A flexible wiring system as claimed in claim 8, wherein said first wire member comprises a bus bar, and said second wire member comprises a printed wire.

* * * * *